L. L. BURTON.
AUTOMATIC MACHINE FOR FORMING PLASTIC BODIES.
APPLICATION FILED SEPT. 24, 1907.
917,748.
Patented Apr. 13, 1909.
3 SHEETS—SHEET 1.
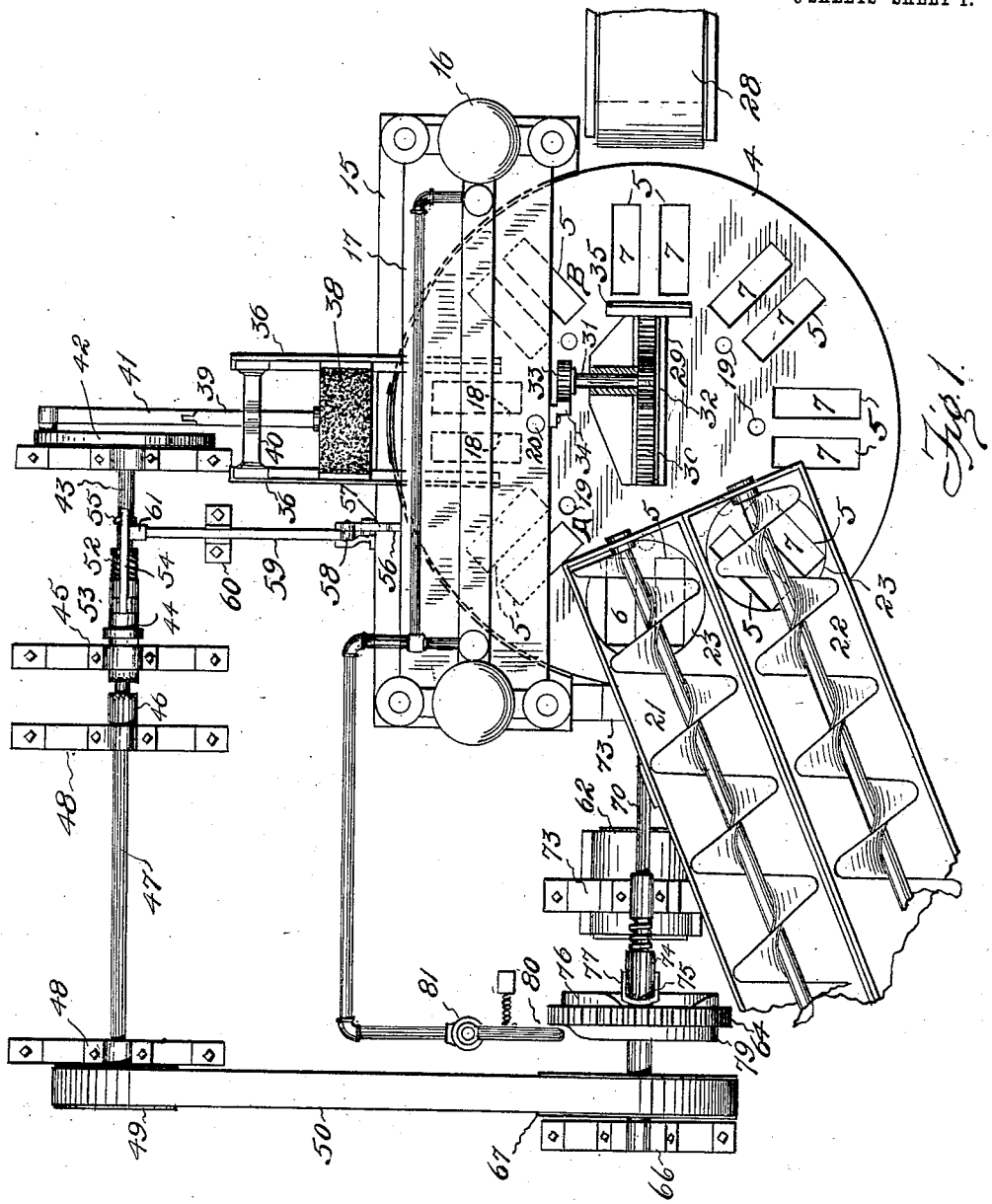
WITNESSES:
INVENTOR
Luther L. Burton,
BY
ATTORNEY L. L. BURTON.
AUTOMATIC MACHINE FOR FORMING PLASTIC BODIES.
APPLICATION FILED SEPT. 24, 1907.
917,748.
Patented Apr. 13, 1909.
3 SHEETS—SHEET 2.
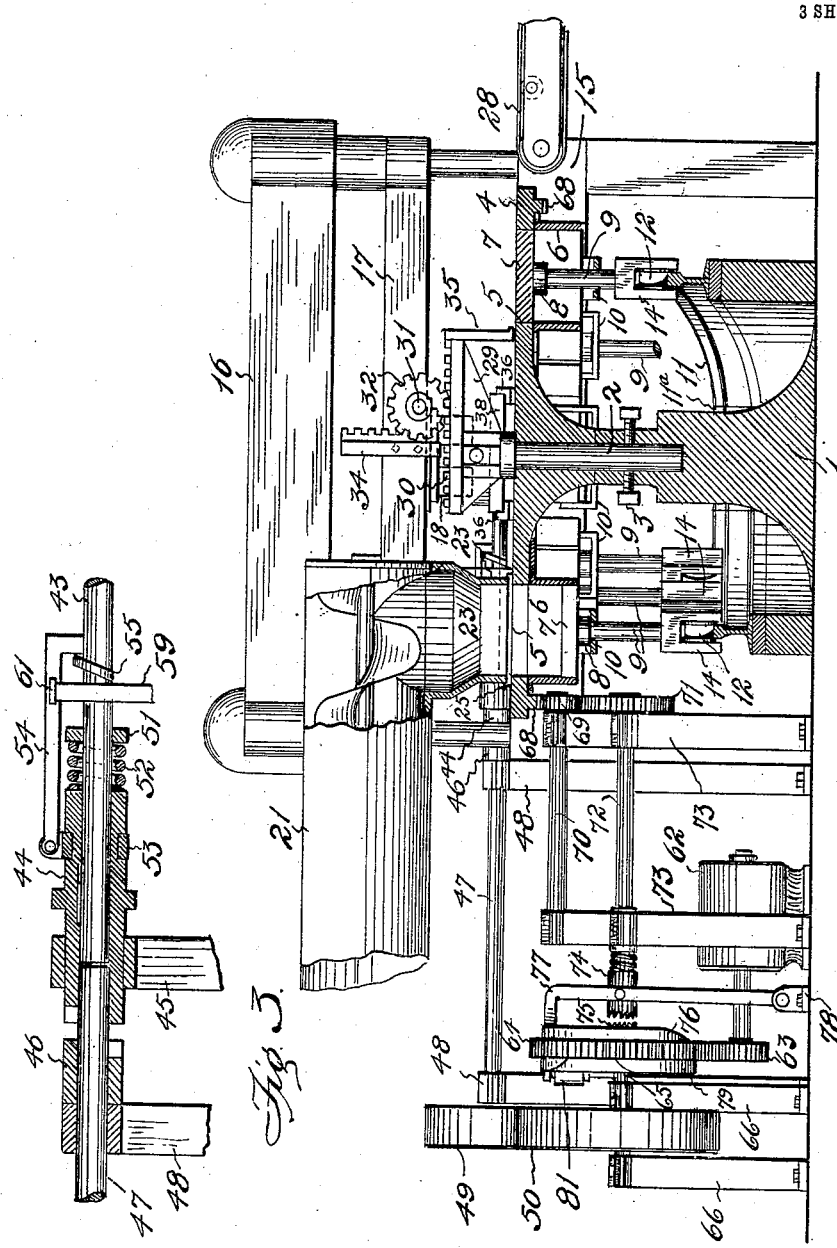
WITNESSES:
INVENTOR
Luther L. Burton,
BY
ATTORNEY

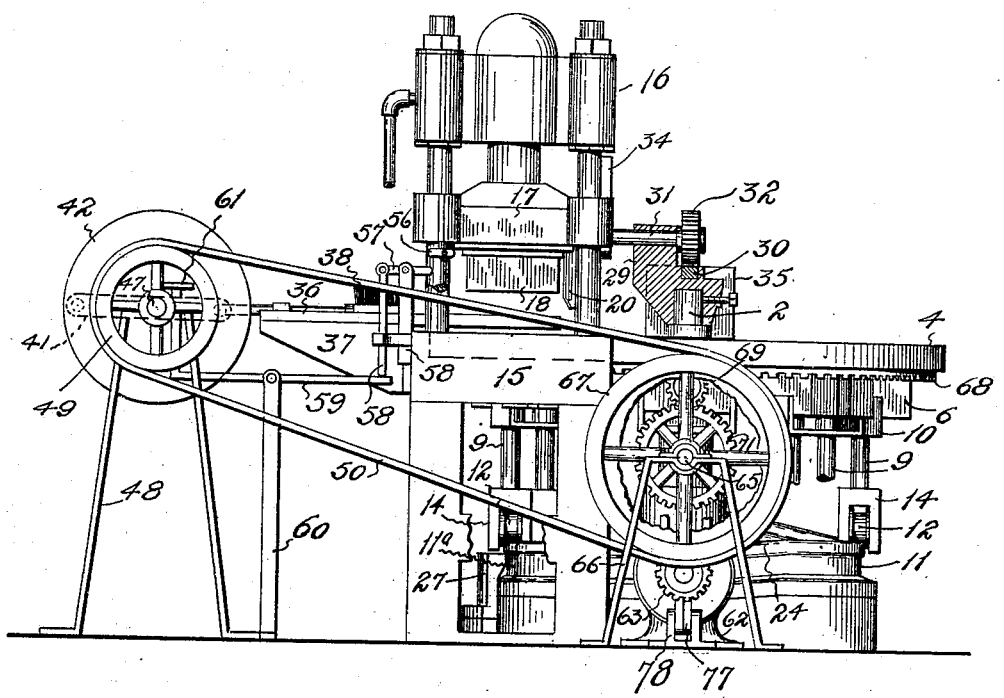

UNITED STATES PATENT OFFICE.

LUTHER L. BURTON, OF FORT WORTH, TEXAS.

AUTOMATIC MACHINE FOR FORMING PLASTIC BODIES.

No. 917,748.     Specification of Letters Patent.     Patented April 13, 1909.

Application filed September 24, 1907. Serial No. 394,256.

*To all whom it may concern:*

Be it known that I, LUTHER L. BURTON, citizen of the United States, residing at Fort Worth, in the county of Tarrant and State of Texas, have invented certain new and useful Improvements in Automatic Machines for Forming Plastic Bodies, of which the following is a specification.

My invention relates to new and useful improvements in automatic machines for forming plastic bodies.

The object of the invention is to provide a machine to which the material is mechanically supplied and which automatically forms and delivers the plastic bodies or blocks with great rapidity.

Among novel features are an automatic starting and stopping mechanism, an ejecting device, an automatic press-head cleaning mechanism and block raising devices.

Finally the object of the invention is to provide a device of the character described that will be strong, durable and efficient and one in which the several parts will not be liable to get out of working order.

With the above and other objects in view, the invention has particular relation to certain novel features, an example of which is described in the specification and illustrated in the accompanying drawings, wherein:

Figure 1 is a plan view of the machine, Fig. 2 is a front elevation showing the table mechanism and a portion of one of the conveyers in section, Fig. 3 is a longitudinal sectional view of the clutch, forming part of the press-head cleaning mechanism, Fig. 4 is an end elevation of the machine, the conveyers and valve mechanism being omitted and parts broken away to illustrate hidden parts, Fig. 5 is a detailed elevation of the table stopping and starting mechanism, Fig. 6 is a section of the pressure stand showing the depressible track in elevation, and Fig. 7 is a transverse vertical sectional view of the same.

In the drawings the numeral 1 designates a suitable pedestal which receives a central pivot post 2 held therein by set screws 3. About this post a circular table 4 is mounted to turn on the pedestal. This table is provided with a plurality of rectangular openings 5, arranged in pairs and each pair equally spaced from the other so that by revolving the table predetermined distances of equal lengths, each pair of openings will successfully register with fixed points.

Mold boxes 6 having substantially the same interior size as the openings 5 are suitably secured to the bottom of the table 4 so as to register with said openings, as shown in Fig. 2. Flat plunger heads 7 are fitted snugly in the mold boxes so as to move vertically therein and into the openings 5. On their under sides the plunger heads are formed at their central portions with collars 8 which receive the upper ends of vertical rods 9. These rods pass snugly through guide brackets 10 secured to the mold boxes and projecting a short distance below the same, so that when the heads 7 are lowered the collars 8 may project below the mold boxes, and the under sides of the said heads lie substantially flush with the lower ends of the mold boxes.

It is obvious that the heads 7 constitute the bottoms of the mold boxes and that the materials to be molded are placed in the boxes on the usual pallets (not shown) which of course rest on the heads. To provide for raising the heads to move the blocks out of the boxes and for lowering the same to receive fresh materials, a circular track 11 is disposed beneath the table and is engaged by flanged rollers 12 carried in foot blocks 14 mounted on the lower ends of the rods 9. These blocks straddle the track and project down a slight distance on each side thereof. By changing the elevation and inclining the track at certain points, it is obvious that when the table 4 is revolved, the rollers 12 riding on the track will raise and lower the rods 9 and heads 7.

By observing Fig. 1 it will be seen that the table 4 swings into the bed 15 of a hydraulic press 16. This press is provided with a vertically movable head bar 17 which carries two rectangular press heads 18 of such size as to pass snugly into the opening 5, so that when the bar 17 is lowered these heads will compress the materials in the mold boxes and form the blocks, two blocks thus being formed simultaneously. In order that the openings 5 may register perfectly with the heads 18 when the table is moved, adjacent each pair of openings a circular opening 19 is formed and adapted to receive a guide pin 20 having a tapered end and carried by the bar 17. This pin projects below the heads 18 so as to enter one of the holes 19 and position the table prior to the entrance of the said heads into the openings 5. Extending over the table are suitably supported spiral conveyers 21 and 22, the conveyer 21 being suitably supplied with a facing material and the conveyer 22 likewise supplied with the mixed materials from which the blocks are formed. Each of these conveyers is provided at the outer end with discharge hoppers 23 spaced at the lower end to register with the openings 5.

Again referring to Fig. 1 it will be noted that the conveyers extend at an angle and it might be here stated that the table is rotated from left to right in the direction of the arrow. The pallets having been placed in the mold box at the front of the machine, the table is given a partial rotation to bring the said mold boxes under the first conveyer, which fills them, the plunger heads 7 being held a short distance above the bottoms of the boxes by the track 11 and rods 9. Upon the next movement of the table to bring the said mold boxes under the discharge hopper 23 of the conveyer 21, the plunger heads 7 are lowered a slight distance by a drop in the track 11 as shown at 24 in Fig. 4. This lowers the materials in the boxes so that a covering or layer of facing material is applied.

A suitable scraper 25 is attached to the far side of the hopper 23 of the conveyer 21 which smooths off the facing material as the table is moved the next step. This next step or partial rotation brings the mold boxes to the position A indicated in Fig. 1 which is really a rest period, however the following mold boxes are going through the operations just described as will be apparent.

Upon the next movement of the table the filled mold boxes are brought under the press heads 18, when suitable mechanism hereinafter described causes the bar 17 and heads 18 to descend and compress the materials in the mold boxes to form the blocks. It will be noted that each time the table is moved the press heads descend so that the pin 20 enters one of the openings 19 thus bringing each pair of mold boxes into proper position. It is further to be observed that the track 11 maintains the same level from beneath the facing point to the pressing point. To take the pressure off of the rollers 12 when the heads 18 descend, a section 11ᵃ of the track 11 is cut beneath the pressing station and supported on a spring mounted plate 26 between standards 27. The blocks 14 projecting below the rollers as described will come to rest on these standards when the press heads descend, the spring mounted track section 11ᵃ yielding under the pressure. In this way a solid support or stand is provided and the blocks properly formed.

After the press heads have started on their upward movement and cleared the table, the latter is given a partial rotation which brings the mold boxes to the position indicated at B in Fig. 1 and upon the next rotation said mold boxes are brought opposite a suitable endless conveyer 28 having its upper surface substantially flush with the surface of the table as indicated in Fig. 2. By observing Fig. 2 it will be noted that the track 11 inclines upward between these points and the rollers 12 riding thereon gradually raise the heads 7 so that the blocks and their pallets are brought to the surface of the table by the time the said mold boxes arrive opposite the conveyer belt. This is the ejecting or discharging point and for automatically moving the blocks onto the conveyer so that they are carried from the machine, a casting 29 mounted on the upper end of the pivot post 2, receives a horizontally mounted rack bar 30 disposed parallel with the press bar 17. A shaft 31 is mounted in the casting at right angles to the rack bar and carries on its outer end a gear 32 meshing with the said bar, while at its inner end it carries a pinion 33 of smaller diameter. This pinion is engaged by a vertical rack bar 34 secured to the bar 17 as shown in Fig. 1. On the outer end of the bar 30 an ejecting plate 35 terminating in close proximity to the surface of the table is mounted. The rack bar 30 is normally retracted as shown in Figs. 1 and 2. As the press-head bar 17 is moved downward the rack bar 34 revolves the pinion 33 to the left with relation to Fig. 2, thus imparting motion to the gear 32 which moves the bar 30 and ejecting plate 35 outward. As the plate moves outward it forces the finished blocks off the table onto the conveyer 28, the table of course being at rest. As the press-head moves upward the rack bar 34 reverses the rotation of the pinion 33 thus restoring the parts to their normal position. Continued movements of the table bring the mold boxes to the starting point, the track 11 inclining downward to lower the heads 7 as will be apparent.

It will be understood that some means for cleaning the surfaces of the press-heads 18 must be provided and to effect this a pair of angular tracks 36 supported on brackets 37 secured to the press bed 15 project over the table as indicated in Fig. 1. These tracks receive a brush 38 inverted and adapted to slide on the tracks beneath the heads 18. This brush is attached to the end of a rod 39 supported in a cross head 40 also sliding on said track. The outer end of the rod 39 has pivotal connection with a disk 42 fixed on the end of a shaft 43. As shown in Fig. 1, the brush 38 is at the end of its outward movement so as not to interfere with the press-heads when the latter are moved downward. When the disk 42 is revolved the brush 38 is moved inward beneath the press heads cleaning them and moved outward to its normal position, so that only one complete revolution of the disk is necessary to clean the said heads. For revolving the said disk and preventing more than a single revolution at each operation a slidable clutch sleeve 44 is mounted in a standard 45 to slide on the shaft 43. This sleeve is adapted to engage a clutch collar 46 fixed on a shaft 47 projecting a short distance into the sleeve 44 and supported in bearing standards 48. On its outer end the shaft 47 carries a pulley 49 driven by a belt 50 to which motion is imparted as will be hereinafter described. The shaft 47 is continuously driven, but so long as the clutch sleeve 44 remains out of contact with the collar 46, the shaft 43 and disk 42 are idle. On the shaft 43 a collar 51 is fixed and between this collar and the end of the sleeve 44 a coiled spring 52 is confined as shown in Fig. 3. This spring acts to move the sleeve 44 into engagement with the collar 46. A collar 53 is loosely confined on the sleeve 44 and has pivotal connection with the end of a hook 54 engaging a cam 55 formed on the shaft 43. When the hook is engaged with the cam the sleeve 44 is drawn out of engagement with the collar 46 and the spring 52 compressed.

It is obvious that by swinging the hook 54 up and out of engagement with the cam 55, the spring 52 will slide the clutch sleeve 44 into engagement with the collar 46, motion thus being imparted to the shaft 43, disk 42 and the brush mechanism operated. For doing this automatically a trigger 56 is mounted on the press head bar 17 to swing upward but not downward. A lever 57 is pivoted in a bracket 58 mounted on the press bed 15 so that the inner end of the lever will be engaged by the trigger 56 as the bar 17 is moved up and down. The downward movement of the bar 17 has no effect upon the lever 57, the trigger 56 swinging and passing by. On the upward movement of the bar, the trigger engages the end of the lever 57 swinging it upward so that its outer end is swung downward. A rod 58 pivotally connected to the outer end of the lever is thus moved downward. A bell-crank lever 59 supported on the upper end of a standard 60 is engaged and swung by the rod 58. The upper end of this lever 59 engages a lug 61 projecting from the side of the hook 54, so that when the bell-crank lever is swung the hook is moved up out of engagement with the cam 55 allowing the spring 52 to force the sleeve 44 into engagement with the collar 46. Just as soon as the trigger 56 rides off of the lever 57 the parts return to their normal position, the hook 54 dropping down, but the sleeve 44 remaining in engagement with the collar 46. As the shaft 43 is revolved the cam 55 riding against the hook draws the sleeve 44 out of engagement with the collar 46, thus permitting only a single revolution of the said shaft and the disk 42.

At one side of the machine a motor 62 is mounted carrying on the end of its shaft a pinion 63 which meshes with a driving gear 64 mounted on a shaft 65 supported in standards 66 between which a driving pulley 67 receiving the belt 50 is mounted on the shaft. In this way the shaft 47 is continuously driven. For revolving the table a circular gear rack 68 is formed on the under side thereof and is engaged by a pinion 69 mounted on a counter shaft 70. A gear 71 mounted on the end of a shaft 72 meshes with the pinion 69 as shown in Figs. 2 and 4. These shafts are supported in suitable bearing standards 73 and the shaft 72 is alined with the shaft 65 terminating in close proximity thereto.

A spring pressed clutch sleeve 74 is slidably mounted on the end of the shaft 72 and adapted to engage a clutch collar 75 carried by the gear 64 to impart motion to the shaft 72. This clutch sleeve is held out of engagement with the clutch collar during a greater portion of the rotation of the gear 64 by a cam 76 and lever 77 as shown in Figs. 2 and 5. The lever 77 has suitable connection with the sleeve 74 being pivotally supported at its lower end in a bracket 78 and bearing against the cam 76 at its upper end. As the lever rides off the cam the sleeve 74 is engaged with the collar 75 and motion imparted to the table, however during the greater portion of the rotation of the gear, the clutch sleeve is out of engagement with the collar and the table at rest, during which period the press-heads are raised and lowered and the ejecting mechanism operated.

On the opposite side of the gear 64 a cam 79 is mounted to engage and swing the lever 80 of a suitable valve 81 which has connection with the valve chambers of the press forming no particular part of this invention. During the time the cam 76 is out of engagement with the lever 77, the cam 79 is also out of engagement with the lever 80 so that the valve 81 is closed and the press thus being inoperative during the rotation of the table.

What I claim, is:

1. In a machine of the character described, the combination with a press and its head, of a rotatable carrier provided with a plurality of mold boxes, means for supplying material to the boxes, an ejector mounted over the carrier and adapted to be extended and retracted to discharge the finished product from the carrier, and means carried by the press head for extending and retracting the ejector.

2. In a machine of the character described, the combination with a press head, a filling hopper, and a hopper for supplying a facing material, and a rotatable carrier provided with a plurality of equally spaced mold boxes, plungers adapted to move vertically in said boxes and a track supporting said plungers having a downwardly inclined portion adjacent the hoppers to permit the plungers to descend as each mold box is moved from beneath the filling hopper to the facing hopper, and means for intermittently rotating the carrier.

3. In a machine of the character described, the combination with a vertically movable press head, a rotatable mold box carrier, and means for rotating said carrier, of a reciprocating press head cleaning device, and means controlled by the press head for reciprocating said device and maintaining it normally out of the path of travel of the press head.

4. In a machine of the character described, the combination with a press head, and a rotatable carrier provided with a plurality of mold boxes, of means for rotating the carrier and bringing the mold boxes under the press head comprising a continuously operating part, means for applying rotary motion to the carrier, and a clutch device interposed between the last named means and the continuously operating part to control the transmission of motion to the carrier.

5. In a machine of the character described, the combination with a press head, of a rotatable carrier provided with a plurality of mold boxes, of a press head cleaning device, means for moving the cleaning device across the face of the press head comprising a revolving part, means for imparting a single revolution to said part comprising a clutch device normally held out of operation, means for releasing the clutch to throw it into operation, and means for returning the clutch to its normal position.

6. In a machine of the character described, the combination with a press head, and a rotatable mold box carrier of a support mounted over the carrier, an ejecting device mounted on said support and adapted to be extended and retracted across the carrier, means for extending and retracting the ejecting device carried on the support, and means carried by the press head for operating the last named means.

7. In a machine of the character described, the combination with a press and its vertically movable head, of a rotatable carrier, mold boxes arranged on said carrier, plungers working in the mold boxes, anti-friction heads mounted on the lower ends of the plungers, a circular track mounted beneath the carrier and engaged by the heads, said track having a spring mounted portion beneath the press, rigid supports adjacent the spring mounted portion adapted to receive the plunger heads when the said track portion is depressed, and means for imparting motion to the rotatable carrier.

8. In a machine of the character described, the combination with a press having its head cut away, and a vertically movable press head, of a register device projecting below the press head, a rotatable carrier projecting into the cut away portion of the press heed and provided with openings to receive the registering device, mold boxes mounted on the carrier, plungers mounted in the mold boxes, means for operating the plungers, means for supplying material to the mold boxes, an ejector mounted over the carrier and arranged to be operated by the press head, a press head cleaning device set to operate by the press head, and means for intermittently rotating the carrier.

9. In a machine of the character described, the combination with a press and its vertically movable head, of a rotatable carrier projecting beneath the press-head, mold boxes mounted on the carrier, plungers mounted in the mold boxes, means for operating the plungers, means for supplying material to the mold boxes, means for supplying a facing material to the mold boxes, an ejector mounted over the carrier and arranged to be operated by the press-head, a press-head cleaning device set to operate by the press-head, and means for intermittently rotating the carrier.

10. In a machine of the character described, the combination with a press and its vertically movable head, of a rotatable carrier projecting beneath the press-head, mold boxes mounted on the carrier, plungers mounted in the mold boxes, a track for operating the plungers, means for supplying material to the mold boxes, an ejector mounted over the carrier and arranged to be operated by the press-head, a press-head cleaning device normally out of the path of the press-head set to operate by the press-head, and means for intermittently rotating the carrier.

In testimony whereof I have signed my name to this specification in the presence of two subscribing witnesses.

LUTHER L. BURTON.

Witnesses:
L. HERN,
M. HEAFER.